United States Patent Office 3,077,493
Patented Feb. 12, 1963

3,077,493
(SULFOPHENOXY)ALKOXY - SUBSTITUTED AROMATIC MONOCARBOXYLIC ACIDS AND DERIVATIVES THEREOF
Christian F. Horn, South Charleston, W. Va., assignor to Union Carbide Corporation, a corporation of New York
No Drawing. Filed Nov. 1, 1961, Ser. No. 149,207
9 Claims. (Cl. 260—470)

This invention relates to the production and use of novel compounds, viz., sulfophenoxyalkoxy-substituted aromatic monocarboxylic acids, their alkali metal sulfonate salts, and the alkyl carboxylate esters thereof.

More particularly, the novel compounds of this invention can be represented by the generic formula:

I) 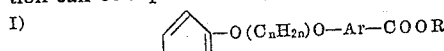

wherein X designates a sulfo ($-SO_3H$) or metallosulfo ($-SO_3M$) radical; M designates an alkali metal atom, as for instance, a lithium, sodium, potassium, rubidium or cesium atom, etc., and preferably designates an alkali metal atom having an atomic number of from 3 to 19, i.e., a lithium, sodium or potassium atom; $n$ designates an integer of from 1 to about 12, and preferably from 1 to about 8; Ar designates a divalent arylene radical, such as a phenylene or naphthylene radical, etc.; and R designates a hydrogen atom or an alkyl radical containing from 1 to about 8 carbon atoms, such as a methyl, ethyl, propyl, butyl, isobutyl, pentyl, hexyl, 2-methylpentyl, 2-ethylbutyl, heptyl, octyl, or 2-ethylhexyl radical, etc., of which the lower alkyl radicals containing from 1 to about 4 carbon atoms are preferred.

As typical of the novel compounds of this invention, there can be mentioned:

3-([4-sulfophenoxy]methoxy)benzoic acid
3-(e[4-((sodiumsulfo))phenoxy]methoxy)benzoic acid
2-(2-[4-sulfophenoxy]ethoxy)benzoic acid
2-(2-[4-((lithiumsulfo))phenoxy]ethoxy)benzoic acid
3-(2-[4-sulfophenoxy]ethoxy)benzoic acid
3-(2-[4-((potassiumsulfo))phenoxy]ethoxy)benzoic acid
3-(2-[3-sulfophenoxy]ethoxy)benzoic acid
3-(2-[3-((sodiumsulfo))phenoxy]ethoxy)benzoic acid
4-(2-[4-sulfophenoxy]ethoxy)benzoic acid
4-(2-[4-((lithiumsulfo))phenoxy]ethoxy)benzoic acid
3-(3-[4-sulfophenoxy]propoxy)benzoic acid
3 - (3 - [4 - ((potassiumsulfo))phenoxy]propoxy)benzoic acid
3-(4-[4-sulfophenoxy]butoxy)benzoic acid
3-(4-[4-((sodiumsulfo))phenoxy]butoxy)benzoic acid
3-(6-[4-sulfophenoxy]hexoxy)benzoic acid
3-(6-[4-((lithiumsulfo))phenoxy]hexoxy)benzoic acid
3-(8-[4-sulfophenoxy]octoxy)benzoic acid
3-(8-[4-((potassiumsulfo))phenoxy]octoxy)benzoic acid
3-(2-ethyl-6-[4-sulfophenoxy]hexoxy)benzoic acid
3-(2-ethyl-6-[4-((sodiumsulfo))phenoxy]hexoxy)benzoic acid
3-(12-[4-sulfophenoxy]dodecoxy)benzoic acid
3 - (12 - [4 - ((lithiumsulfo))phenoxy]dodecoxy)benzoic acid
4-(2-[4-sulfophenoxy]ethoxy)naphthoic acid
4 - (2 - [4-((potassiumsulfo))phenoxy]ethoxy)naphthoic acid
Methyl 3-([4-sulfophenoxy]methoxy)benzoate
Methyl 3-([4-((sodiumsulfo))phenoxy]methoxy)benzoate
Octyl 2-(2-[4-sulfophenoxy]ethoxy)benzoate
Octyl 2-(2-[4-((lithiumsulfo))phenoxy]ethoxy)benzoate
2-ethylhexyl 3-(2-[4-sulfophenoxy]ethoxy)benzoate
2 - ethylhexyl 3 - (2-[4-((potassiumsulfo))phenoxy]ethoxy)benzoate
Butyl 3-(2-[3-sulfophenoxy]ethoxy)benzoate
Butyl 3-(2-[3-((sodiumsulfo))phenoxy]ethoxy)benzoate
Propyl 4-(2-[4-sulfophenoxy]ethoxy)benzoate
Propyl 4-(2-[4-((lithiumsulfo))phenoxy]ethoxy)benzoate
Ethyl 3-(3-[4-sulfophenoxy]propoxy)benzoate
Ethyl 3-(3-[4-((potassiumsulfo))phenoxy]propoxy)benzoate
Methyl 3-(4-[4-sulfophenoxy]butoxy)benzoate
Methyl 3-(4-[4-((sodiumsulfo))phenoxy]butoxy)benzoate
Methyl 3-(6-[4-sulfophenoxy]hexoxy)benzoate
Methyl 3-(6-[4-((lithiumsulfo))phenoxy]hexoxy)benzoate
Methyl 3-(8-[4-sulfophenoxy]octoxy)benzoate
Methyl 3-(8-[4-((potassiumsulfo))phenoxy]octoxy)benzoate
Methyl 3-(2-ethyl-6-[4-sulfophenoxy]hexoxy)benzoate
Methyl 3 - (2 - ethyl - 6-[4-((sodiumsulfo))phenoxy]hexoxy)benzoate
Methyl 3-(12-[4-sulfophenoxy]dodecoxy)benzoate
Methyl 3 - (12 - [4-((lithiumsulfo))phenoxy]dodecoxy)benzoate
Methyl 4-(2-[4-sulfophenoxy]ethoxy)naphthoate
Methyl 4 - (2 - [4 - ((potassiumsulfo))phenoxy]ethoxy)naphthoate, and the like.

The present invention is especially concerned with the production and use of the sulfophenoxyalkoxybenzoic acids, their alkali metal sulfonate salts, and the alkyl carboxylate esters thereof, represented by the sub-generic formula:

(II) 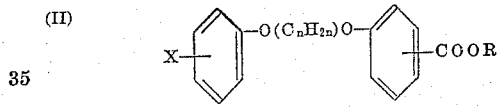

wherein X, $n$ and R are as defined above.

The novel compounds of this invention can be obtained by various methods, which, it is to be noted, in no way limit the invention. The benzoic acid derivatives can, for example, be obtained by steps which include the sulfonation of a member of a known class of compounds, viz., the phenoxyalkoxybenzoic acids and alkyl esters thereof represented by the formula:

(III) 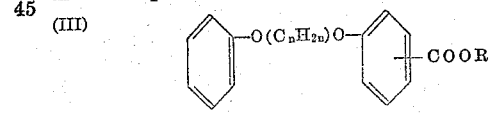

wherein $n$ and R are as defined above. As typical of such known compounds, there can be mentioned:

3-(phenoxymethoxy)benzoic acid
2-(2-phenoxyethoxy)benzoic acid
3-(2-phenoxyethoxy)benzoic acid
4-(2-phenoxyethoxy)benzoic acid
3-(3-phenoxypropoxy)benzoic acid
3-(4-phenoxybutoxy)benzoic acid
3-(6-phenoxyhexoxy)benzoic acid
3-(8-phenoxyoctoxy)benzoic acid
3-(2-ethyl-6-phenoxyhexoxy)benzoic acid
3-(12-phenoxydodecoxy)benzoic acid
Methyl 3-(phenoxymethoxy)benzoate
Octyl 2-(2-phenoxyethoxy)benzoate
2-ethylhexyl 3-(2-phenoxyethoxy)benzoate
Butyl 4-(2-phenoxyethoxy)benzoate
Ethyl 3-(3-phenoxypropoxy)benzoate
Methyl 3-(4-phenoxybutoxy)benzoate
Methyl 3-(6-phenoxyhexoxy)benzoate
Methyl 3-(8-phenoxyoctoxy)benzoate
Methyl 3-(2-ethyl-6-phenoxyhexoxy)benzoate
Methyl 3-(12-phenoxydodecoxy)benzoate, and the like.

Moreover, while reference is hereinafter made, for illustrative purposes, to the production of the benzoic acid derivatives of this invention, i.e., the compounds represented above by Formula I wherein Ar represents a phenylene radical, the disclosure is also applicable to the corresponding naphthoic acid derivatives. Thus, for instance, compounds represented by the formula:

(IV)
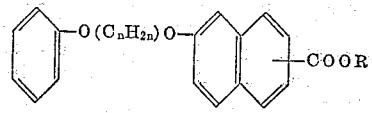

wherein $n$ and R are as defined above, such as 4-(2-phenoxyethoxy)naphthoic acid and methyl 4-(2-phenoxyethoxy)naphthoate, etc., can also be employed as starting materials or precursors.

The phenoxyalkoxybenzoic acids and esters hereinabove described can themselves be obtained, for example, by the reaction of a phenoxyalkylhalide with an alkali metal carboxy- or carboalkoxy phenolate in accordance with the equation:

(V)
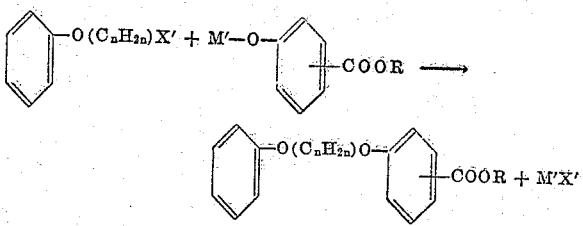

wherein M' designates an alkali metal atom, such as a sodium atom, etc., X' designates a halogen atom, such as a chlorine or bromine atom, etc., and $n$ and R are as defined above. Such a reaction can be carried out by bringing the halide and the phenolate into reactive admixture in a suitable solvent, such as ethanol, N,N-dimethylformamide, dioxane, etc., and at a temperature of from about 20° C. to about 100° C., or higher.

The sulfonation of the phenoxyalkoxybenzoic acid or ester represented above by Formula III to the corresponding sulfonic acid derivative represented above by Formula II, wherein X designates the sulfo radical, can be carried out by known sulfonation procedures. Thus, for example, the phenoxyalkoxybenzoic acid or ester can be sulfonated by reaction with a mild sulfonating agent comprised of a mixture of sulfuric acid and acetic anhydride, at a temperature of from about −15° C. to about 50° C., and preferably from about 0° C. to about 25° C. The phenoxyalkoxybenzoic acid or ester, of which the latter is preferably employed, is best introduced to the sulfonating agent in solution, using, by way of illustration, an inert solvent such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the phenoxyalkoxybenzoic acid or ester can vary from about 0.5 to about 5 moles of sulfuric acid per mole of the phenoxyalkoxybenzoic acid or ester, with a ratio of from about 0.8 to about 1.5 moles of sulfuric acid per mole of the phenoxyalkoxybenzoic acid or ester being preferred.

Produced as hereinabove described, the sulfonated phenoxyalkoxybenzoic acid or ester product can be recovered, if desired, in any convenient manner, such as by crystallization and filtration, by isolation as a residue product upon evaporation or distillation of any solvent present, etc. Moreover, while the para-substituted derivative in which the sulfo radical is located at the 4-position of the phenyl ring is most readily produced, other sulfonated derivatives, i.e., the ortho- or meta-substituted derivatives, are also often formed, or can be obtained by varying the sulfonation reaction in a manner determinable by those skilled in the art in light of this disclosure.

When the starting material employed is the free benzoic acid, i.e., when R of Formula IV is hydrogen, the sulfonated product can readily be converted to the corresponding alkyl carboxylate by esterification in conventional manner with an alkyl alcohol containing from 1 to about 8, and preferably from 1 to about 4 carbon atoms. The presence of the sulfo radical during the esterification serves to catalyze the reaction (auto-catalysis), thus obviating the conventional addition of an esterification catalyst.

The sulfonated phenoxyalkoxybenzoic acid or ester can thereafter be reacted with an alkali metal hydroxide or alkoxide, or an alkali metal salt of an acid weaker than sulfonic cid, such as acetic acid or benzoic acid, etc., to form the corresponding alkali metal sulfonate salt, i.e., metallosulfo derivative. Preferably, such a reaction is carried out in an alcoholic or aqueous solution, and at a temperature of from about 5° C. to about 110° C., and preferably from about 20° C. to about 50° C.

The mole ratio of alkali metal hydroxide, alkoxide, or salt to the sulfophenoxyalkoxybenzoic acid or ester can vary from about 1 to about 10 moles of the alkali metal-containing compound per mole of the sulfophenoxyalkoxybenzoic acid or ester, with a ratio of from about 1 to about 2.5 moles of the alkali metal hydroxide, alkoxide, or salt per mole of the sulfophenoxyalkoxybenzoic acid or ester being preferred. Moreover, when the sulfonated product undergoing reaction is the benzoate ester, the conversion of the product to the alkali metal sulfonate derivative can be effected conveniently by titration with alkali metal hydroxide or alkoxide, preferably in alcoholic solution, to a pH of 7 to 8.

The alkali metal sulfonate salt thus produced can subsequently be recovered in any convenient manner, such as that described above in connection with the recovery of the sulfonic acid derivatives.

The novel compounds of this invention find use in a wide variety of applications. Such compounds can be used, for instance, as intermediates in the production of dyestuffs, pharmaceuticals, and ion exchange resins. In addition, the novel compounds of this invention are eminently suited for use as modifiers in the production of high melting, crystalline, linear polyesters, especially polyesters formed by the polycondensation reaction of terephthalic acid, or ester-forming derivative thereof, with an aliphatic diol, or ester-forming derivative thereof. The modified polyesters prepared in part from the compounds of this invention, and particularly from the alkali metal sulfonate derivatives of this invention, i.e., by the incorporation of the novel compounds of this invention in otherwise conventional polycondensation reaction mixtures, can, in turn, be employed to produce fibers which are readily dyeable with cationic and disperse dyestuffs by standard dyeing procedures. The dyed fibers thus obtained possess shades having good wash fastness and light fastness, as well as stability to conventional dry cleaning procedures. The modified polyesters prepared in part from the compounds of this invention can also be used to produce films and molded articles.

That the novel compounds of this invention could be employed in the production of high-melting, crystalline, linear polyesters was surprising and unexpected since phenoxyalkoxybenzoic acids and esters, the basic structures of the compounds of this invention, ordinarily discolor and/or decompose when heated to the temperatures employed in making the polyesters. Thus, it was unexpected that the compounds of this invention would be sufficiently stable, both chemically and thermally, to withstand the polycondensation conditions in the presence of the other reactants, as well as the high temperatures necessary for spinning the polyesters. It was also surprising that the fibers produced from these polyesters showed no disadvantages in physical properties over the unmodified polyester fibers, and that they exhibited greatly enhanced dyeability properties, as well as many other desirable textile properties. The improved dyeability of the modified polyesters is believed due in no small part to the flexibility or rotatability of the sulfophenyl (or metallosulfophenyl) radical of the compounds of this invention about the adjacent oxygen atom, thereby making the sulfo (or metallosulfo) radical more accessible to the dye molecules during dyeing operations.

At the same time, the novel compounds of this invention, being monofunctional ester-forming compounds or derivatives thereof, advantageously serve as chain-terminators in the polycondensation reaction producing the polyesters, thereby affording effective control over the molecular weight of the polyester products. The compounds of this invention are, in fact, particularly well suited for use as molecular weight regulators in a continuous polycondensation process due to their extremely low volatility. Thus, the compounds are not readily removed from the reaction melt by either vacuum or contact with inert gas which may be passed through the melt during the polycondensation. Moreover, since the compounds of this invention occur in the resulting polyesters only at the end of linear chains, they do not materially effect the desirable physical properties of the polyesters. Hence, the proportion in which the compounds of this invention are employed or incorporated in order to produce polyesters having improved dyeability, i.e., from about 1 to about 5 mole percent based upon the total carboxylate content of the polyesters, is ordinarily much less than that in which difunctional dye-assistants, which interrupt the polymer chain, are conventionally employed.

The following specific examples serve as further illustration of the present invention.

Example I

To 150 milliliters of absolute ethanol, contained in a 500 milliliter 4-necked flask equipped with a stirrer, thermometer and condenser, there were slowly added 11.5 grams of sodium metal, at room temperature. The resulting solution was heated to a temperature of 80° C. to dissolve all of the sodium present. Thereafter, by means of a dropping funnel, 76.07 grams of methyl 3-hydroxybenzoate dissolved in 150 milliliters of absolute ethanol were slowly added to the contents of the flask over a 30-minute period, and at a temperature maintained at 50° C., accompanied by continued stirring. In this manner, an ethanol solution of methyl 3-(sodiumoxy)benzoate was obtained. This solution was then slowly introduced over a 1-hour period into a similar apparatus containing 100 milliliters of a refluxing ethanol solution in which there were dissolved 100.54 grams of phenoxyethylbromide, at a temperature of 80° C. Reflux of the reaction mixture was continued at a temperature of 80° C. for a period of 17.75 hours. The pH of the mixture measured at the beginning of the reflux period was 11.5; at the conclusion thereof, the pH was 10.0. A sodium bromide precipitate was formed. The reaction mixture was then cooled to room temperature and filtered. The filter cake was dissolved in hot ethanol and refiltered to remove 23 grams of sodium bromide. The filtrate was thereafter cooled to 0° C. to precipitate the desired product. Finally, this precipitated product was recovered by filtration, and dried in a vacuum oven. In this manner, 100 grams of methyl 3-(2-phenoxyethoxy)benzoate were obtained as a white crystalline product having a melting point of 62° C. Analysis: Calculated for $C_{16}H_{16}O_4$: C, 70.57; H, 5.93. Found: C, 69.98; H, 6.18.

To an apparatus similar to that described above there were charged 59 grams of acetic anhydride. The anhydride was cooled to −5° C., whereupon 28 grams of sulfuric acid were added dropwise thereto, accompanied by stirring and continued cooling, so that the temperature of the resulting mixture was maintained in the range of from −5° C. to 0° C. To this mixture there was slowly added a solution containing 70 grams of methyl 3-(2-phenoxyethoxy)benzoate, obtained as described above, dissolved in 200 grams of ethylene dichloride. After stirring the resulting solution for a period of 4 hours at a temperature maintained in the range of from −5° C. to 0° C., the solution was gradually warmed to room temperature. Thereafter, 200 milliliters of methanol were added to the solution, which was then refluxed for several minutes to esterify the acid present, including the acetic anhydride component of the sulfonating agent. The solution was subsequently transferred to an evaporating dish, from which the solvent present was evaporated upon standing overnight. In this manner, methyl 3-(2-[4-sulfophenoxy]ethoxy)benzoate was obtained as a residue product. The residue was then dissolved in 300 milliliters of methanol, transferred to a 500 milliliter flask, and refluxed for a period of 5 hours, while distilling off a small amount of methyl acetate and any trace of ethylene dichloride still present. During the distillation, methanol was added to the solution to maintain a constant volume of about 400 milliliters. Thereafter, the solution was cooled to about room temperature and titrated with methanolic sodium hydroxide to a pH of 7.2. A precipitate was formed and was filtered and purified by extraction with methanol in a Soxhlet extractor. In this manner, 45 grams of methyl 3-(2-[4-((sodiumsulfo))phenoxy]-ethoxy)benzoate, having a melting point of 355–358° C., were obtained. Analysis: Calculated for $C_{16}H_{15}O_7SNa$: C, 51.33; T, 4.04. Found: C, 51.02; H, 4.16. Infrared analysis was consistent with the identity of the product. In addition, 59 grams of this product was isolated and recovered as a residue product from the methanol extractant.

Such a product was subsequently employed as a modifier in the production of fiber-forming polyesters as follows. A mixture of 175 grams of dimethyl terephthalate, 6.9 grams of methyl 3-(2-[4-((sodiumsulfo))phenoxy]-ethoxy)benzoate, 180 grams of ethylene glycol, 0.063 gram of zinc acetate, and 0.018 gram of antimony oxide were charged to a reactor and heated at a temperature of 183–186° C. for a period of 6.5 hours to bring about an ester exchange, while distilling the methanol formed during the reaction. Thereafter, the reaction mixture was heated to a temperature of 265° C. over a period of 2 hours to remove the glycol excess. The temperature was subsequently maintained in the range of from 261° C. to 265° C. for a period of 6.5 hours to carry out the polycondensation. During the reaction, a vigorous stream of nitrogen was passed through the melt at atmospheric pressure. The crystalline polymer thus obtained had a melting point of 250° C., and was characterized by excellent dyeable fiber-forming and cold drawing properties. In like manner, butyl 3-(2-[4-((lithiumsulfo))phenoxy]-ethoxy)benzoate, produced by the sulfonation of butyl 3-(2-phenoxyethoxy)benzoate, followed by titration with lithium hydroxide, is also employed to produce modified, dyeable fiber-forming polyethylene terephthalate polyesters.

Example II

To 2.5 liters of absolute ethanol, contained in a 5 liter, 4-necked flask equipped with a stirrer, thermometer and condenser, there were slowly added 92 grams of sodium metal, at room temperature. Thereafter, by means of a dropping funnel, 609 grams of methyl 2-hydroxybenzoate were slowly added to the contents of the flask over a 30-minute period, at room temperature, accompanied by continued stirring. In this manner, a methyl 2-(sodiumoxy)-benzoate precipitate was formed. 800 milliliters of an ethanol solution in which there were dissolved 880 grams of phenoxyethylbromide was then added to the reaction mixture at room temperature, accompanied by continued stirring, to form a thick slurry. The slurry was heated to a temperature of 80° C., at which temperature, solution occurred, and a reflux point was reached. Reflux of the reaction mixture was continued at this temperature for a period of 30 hours. The pH of the mixture measured at the beginning of the reflux period was 12.5; at the conclusion thereof, the pH was 10.4. A sodium bromide precipitate was formed, and was removed by filtering the reaction mixture while hot. The reaction mixture was then cooled to room temperature to precipitate the desired product, and filtered. The filter cake was dissolved in heptane and refiltered to remove any sodium bromide still present. Finally, the product was recovered by filtration, and dried in a vacuum oven. In this manner, 668 grams of methyl 2-(2-phenoxyethoxy)benzoate were obtained as a white crystalline product having a melting point of 73–75° C.

To an apparatus similar to that described above there were charged 546 grams of acetic anhydride. The anhydride was cooled to a temperature of −10° C., whereupon 249 grams of sulfuric acid were added dropwise thereto, accompanied by stirring and continued cooling, so that the temperature of the resulting mixture was maintained in the range of from −10° C. to 0° C. To this mixture there was slowly added a solution containing 662 grams of methyl 2-(2-phenoxyethoxy)benzoate, obtained as described above, dissolved in 2100 grams of ethylene dichloride. After stirring the resulting solution for 5 hours at a temperature maintained in the range of from 0° C. to 5° C., the solution was gradually warmed to room temperature. Thereafter, 2000 milliliters of methanol were added to the solution, which was then refluxed for several minutes to esterify the acid present. The solution was subsequently transferred to an evaporating dish, from which the solvent present was evaporated upon standing overnight. In this manner, methyl 2-(2-[4-sulfophenoxy]ethoxy)benzoate was obtained as a residue product. The residue was then dissolved in 2000 milliliters of methanol, transferred to a 2-liter flask, and refluxed for a period of 5 hours, while distilling off methyl acetate and any trace of ethylene dichloride still present. During the distillation, methanol was added to the solution to maintain a constant volume of about 3000 milliliters. Thereafter, the solution was cooled to about room temperature, and 2563 grams of the solution was titrated with methanolic sodium hydroxide to a pH or 7.7. A precipitate was formed and was filtered and purified by extraction with methanol in a Soxhlet extractor. In this manner, 288 grams of methyl 2-(2-[4-((sodiumsulfo))phenoxy]ethoxy)benzoate, having a melting point above 400° C. were obtained. Infrared analysis was consistent with the identity of the product. In similar manner, another 200 grams of the methanol solution of methyl 2-(2-[4-sulfophenoxy]ethoxy)benzoate, obtained as described above, were titrated with methanolic potassium hydroxide to a pH of 7.8, and the resulting precipitate filtered and purified to yield 40 grams of methyl 2-(2-[4-((potassiumsulfo))phenoxy]ethoxy)benzoate. Infrared analysis was again consistent with the identity of the product.

When employed as a modifier for a polyethylene terephthalate polyester in a manner similar to that described in Example I, the independent incorporation of both methyl 2-(2-[4 - ((sodiumsulfo))phenoxy]ethoxy)benzoate and methyl 2 - (2 - [4 - ((potassiumsulfo))phenoxy]ethoxy)benzoate resulted in the production of a crystalline polymer characterized by excellent dyeable fiber-forming and cold drawing properties. In like manner, butyl 2-(2-[4-((lithiumsulfo))phenoxy]ethoxy)benzoate, produced by the sulfonation of butyl 2-(2-phenoxyethoxy)benzoate, followed by titration with lithium hydroxide, is also employed to produce modified, dyeable fiber-forming polyethylene terephthalate polyesters.

In addition, to 60 grams of methyl 2-(4-[sulfophenoxy]ethoxy)benzoate, obtained as described above, there were added 300 milliliters of distilled water. The resulting solution was then refluxed for a period of 20 hours. Upon subsequent evaporation of the water present, 37 grams of 2-(4-[sulfophenoxy]ethoxy)benzoic acid were recovered as a residue product. Infrared analysis was consistent with the identity of the product. 37 grams of the product was then dissolved in 43 milliliters of water, and titrated with aqueous lithium hydroxide to a pH of 3.0. Upon evaporation of the water present, 20 grams of 2-(2-[4-((lithiumsulfo))phenoxy]ethoxy)benzoic acid were recovered as a residue product. Infrared analysis was again consistent with the identity of the product.

*Example III*

To 500 milliters of anyhdrous ethanol, contained in a 2-liter, 4-necked flask equipped with a stirrer, thermometer and condenser, there were slowly added 18.9 grams of sodium metal, at room temperature. Thereafter, by means of a dropping funnel, 125.06 grams of methyl 4-hydroxybenzoate dissolved in 500 milliliters of anhydrous methanol were slowly added to the contents of the flask over a 5-minute period, at room temperature, accompanied by continued stirring. In this manner, an ethanol solution of methyl 2-(sodiumoxy)benzoate was obtained. This solution was then heated to reflux at a temperature of 65° C., and 220 grams of phenoxypentyl-bromide were slowly added thereto by means of a dropping funnel over a 15-minute period. Reflux of the reaction mixture was continued at a temperature of 65° C. for a period of 30 hours. The pH of the mixture measured at the beginning of the reflux period was 12.0; at the conclusion thereof, the pH was 8.2. A sodium bromide precipitate was formed. The reaction mixture was then distilled to remove the methanol present. The residue was dissolved in diethyl ether and filtered to remove the sodium bromide present, which remained as a precipitate. The ether was evaporated and the residue was dissolved in heptane and refiltered to remove any trace of sodium bromide still present. The filtrate was then cooled to room temperature to precipitate the desired product. Finally, the product was recovered by filtration, and dried in a vacuum oven. In this manner, 227 grams of methyl 4-(5-phenoxypentoxy)benzoate were obtained as a white crystalline product having a melting point of 64° C. Analysis: Calculated for $C_{19}H_{22}O_4$: C, 72.6; H, 7.07. Found: C, 70.91; H, 6.98. Infrared analysis was consistent with the identity of the product.

To an apparatus similar to that described above there were charged 161 grams of acetic anhydride. The anhydride was cooled to a temperature of −10° C., whereupon 73.6 grams of sulfuric acid were added dropwise thereto, accompanied by stirring and continued cooling, so that the temperature of the resulting mixture was maintained in the range of from −10° C. to −5° C. To this mixture there was slowly added a solution containing 225 grams of methyl 4-(5-phenoxypentoxy)benzoate, obtained as described above, dissolved in 500 grams of ethylene dichloride. After stirring the resulting solution for 5 hours at a temperature maintained in the range of from 0° C. to 5° C., the solution was gradually warmed to room temperature. Thereafter, 1 liter of methanol was added to the solution, which was then refluxed at a temperature of 64° C. for a period of 2 hours to esterify the acid present. The solution was subsequently transferred to an evaporating dish, from which the solvent present was evaporated upon standing overnight. In this manner, methyl 4-(5-[4-sulfophenoxy]pentoxy)benzoate was obtained as a residue product. The residue was then dissolved in 1 liter of methanol, transferred to a flask, and refluxed for a period of 5 hours while distilling off methyl acetate and any trace of ethylene dichloride still present. During the distillation, methanol was added to the solution to maintain a constant volume of about 1.5 liters. Thereafter, the solution was cooled to about room temperature, and 1006 grams of the solution was titrated with methanolic sodium hydroxide to a pH of 8.2. A precipitate was formed and was recovered by filtration. In this manner, 194 grams of methyl 4 - (5 - [4 - ((sodiumsulfo))phenoxy]pentoxy)

benzoate were obtained. Infrared analysis was consistent with the identity of the product. In similar manner, another 500 grams of the methanol solution of methyl 4-(5-[4-sulfophenoxy]pentoxy)benzoate, obtained as described above, were titrated with methanolic lithium hydroxide to a pH of 7.6. Upon distillation of the methanol present, a white solid formed, and was dried in a vacuum oven to yield 90 grams of methyl 4-(5-[4-((lithiumsulfo))phenoxy]pentoxy)benzoate. Analysis: Calculated for $C_{19}H_{21}O_7Li \cdot H_2O$: C, 54.54; H, 5.53. Found: C, 54.62; H, 5.40. Infrared analysis was again consistent with the identity of the product.

When employed as a modifier for a polyethylene terephthalate polyester in a manner similar to that described in Example I, the independent incorporation of both methyl 4-(5-[4-((sodiumsulfo))phenoxy]pentoxy)benzoate and 4-(5-[4-((lithiumsulfo))phenoxy]pentoxy) benzoate resulted in the production of a crystalline polymer characterized by excellent dyeable fiber-forming and cold drawing properties. In like manner, ethyl 4-(8-[4-((potassiumsulfo))phenoxy]octoxy)benzoate, produced by the sulfonation of ethyl 4-(8-phenoxyoctoxy)benzoate, followed by titration with potassium hydroxide, is also employed to produce modified, dyeable fiber-forming polyethylene terephthalate polyesters.

What is claimed is:
1. A compound of the formula:

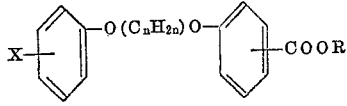

wherein X is selected from group consisting of the —$SO_3H$ and —$SO_3M$, M being an alkali metal atom, $n$ is an integer of from 1 to 12, and R is selected from the group consisting of hydrogen and alkyl containing from 1 to 8 carbon atoms.

2. A compound of the formula:

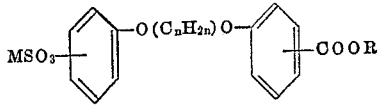

wherein M is an alkali metal atom having an atomic number of from 3 to 19, $n$ is an integer of from 1 to 8, and R is lower alkyl.

3. Methyl 3-(2-[4-((sodiumsulfo))phenoxy]ethoxy)-benzoate.
4. Methyl 2-(2-[4-((sodiumsulfo))phenoxy]ethoxy)-benzoate.
5. Methyl 2-(2-[4-((potassiumsulfo))phenoxy]ethoxy)-benzoate.
6. Methyl 2-(2-[4-((lithiumsulfo))phenoxy]ethoxy)-benzoate.
7. Methyl 4-(5-[4-((sodiumsulfo))phenoxy]pentoxy)-benzoate.
8. Methyl 4-(5-[4-((lithiumsulfo))phenoxy]pentoxy)-benzoate.
9. 2-(4-[sulfophenoxy]ethoxy)benzoic acid.

No references cited.